May 12, 1953  R. D. ACTON  2,638,046
CONTROL MEANS FOR TRACTOR-CONNECTED IMPLEMENTS
Original Filed March 22, 1944
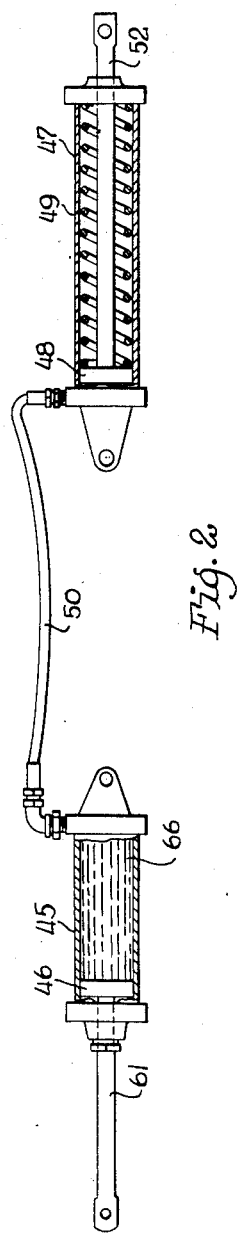
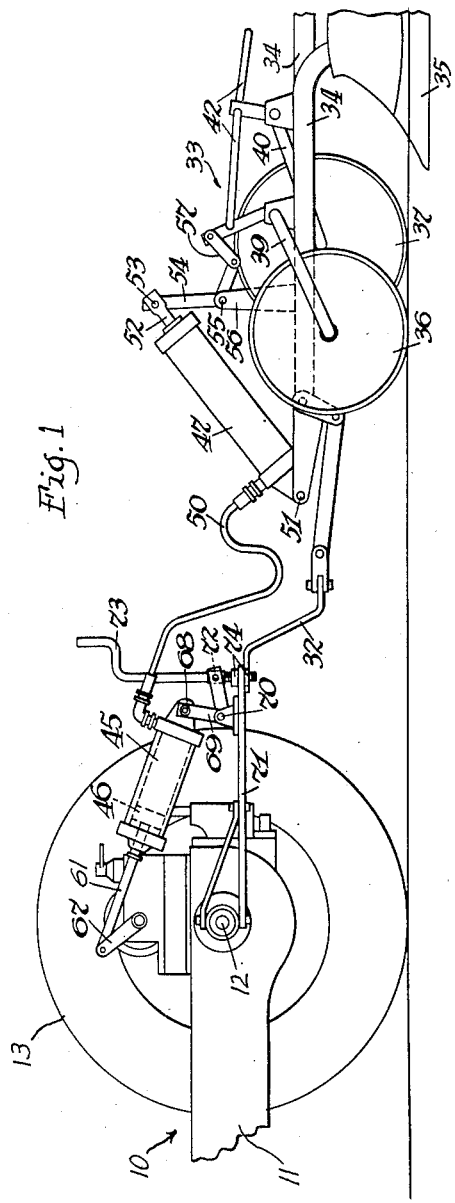
INVENTOR.
Russel D. Acton
BY Paul O. Pippel
Atty.

Patented May 12, 1953

2,638,046

UNITED STATES PATENT OFFICE 2,638,046

CONTROL MEANS FOR TRACTOR-CONNECTED IMPLEMENTS

Russel D. Acton, Chicago, Ill., assignor to International Harvester Company, a corporation of New Jersey Original application March 22, 1944, Serial No. 528,672. Divided and this application April 20, 1946, Serial No. 663,713

2 Claims. (Cl. 97—46.27)

This application is a division of my copending application Serial No. 528,672, filed March 22, 1944, now U. S. Patent No. 2,410,918, issued November 12, 1946.

This invention relates to a control means for a tractor-connected implement. More specifically it relates to fluid-pressure means for controlling a trail-behind implement from a tractor.

It is known to provide a tractor-connected implement with a fluid-power device for adjusting and controlling the implement, the device being actuated by the power of the tractor. With such an arrangement there is normally a hose for fluid running from the tractor to the implement. The disadvantage is that when the implement is disconnected from the tractor the fluid-power means must also be disconnected from the implement or from the tractor or from both, and this normally requires a disconnection of a line or conduit through which fluid is passed. With the break of a fluid line there is considerable danger of loss of the fluid. In the present invention the fluid-power means is removed without breaking of the fluid-carrying line.

An object of the present invention is to provide an improved control means for a tractor-connected implement.

A further object is the provision of an improved pressure-fluid means for adjusting a tractor-connected implement from the tractor.

According to the present invention, a special detachable unit comprising a first cylinder with a piston therein, a second cylinder with a piston therein, and a connecting conduit is mounted so that one cylinder is upon a tractor and the other cylinder is upon an implement connected to the tractor. The piston in the cylinder on the tractor is shifted in the cylinder by power derived from the tractor power plant acting through external mechanical means on the tractor. An adjustable mounting means for one of the cylinders makes it possible to shift this cylinder relatively to the piston therein to change the phase of relative positions of the implement part and the external mechanical means on the tractor. When the implement is to be disconnected from the tractor, the one cylinder is disconnected from the implement, and the disconnection of the cylinder and the piston on the tractor from the source of tractor power is made at the external mechanical means through which power is supplied to the cylinder of the piston. Thus, there is no disconnection through a fluid line, and the disadvantages of such a disconnection are avoided.

In the drawings:

Figure 1 shows a side view of a tractor with parts removed, and a plow (shown fragmentarily) connected at the rear of the tractor;

Figure 2 is a detail view showing parts of the special unit of the present invention by which the plow is adjusted from the tractor.

Reference character 10 designates a tractor having a body 11, rear axle 12, and rear wheels 13 of which only one is shown. A plow 33 is coupled to the tractor in a manner to be towed thereby.

The tractor 10 carries a draw-bar 32—71 to which the plow 33 is connected. The plow 33 comprises beams 34, plow bottoms 35 (one being shown) respectively mounted on said beams, wheels 36 and 37 connected to the beams by cranks 39 and 40. The cranks are interconnected by means of a link 42. Figure 1 shows the plow bottoms in working position. When the plow is to be transported, the cranks 39 and 40 through which the wheels are connected are swung with respect to the plow beams 34 so that the beams are raised. Raising of the plow to transport position is accomplished by a special unit now to be described.

As seen in Figures 1 and 2, this unit comprises a cylinder 45 with a piston 46 slidable therein, a cylinder 47 with a piston 48 slidable therein, a spring 49 urging the piston 48 into the position shown in Figure 2, and a conduit 50 connecting the two cylinders. The cylinder 47 is connected to the plow 33, as indicated at 51. A rod 52 connected with the piston 48 extends from the cylinder 47 and is connected at 53 with a bell crank 54 pivoted at 55 on a bracket 56 secured to the plow beams 34. The bell crank 54 is connected with the crank axle 39 by a link 57.

The piston rod 61 of the ram 45—46 is pivotally connected to a tractor-actuated power-driven means in the form of a crank 67 which is selectively controllable for effecting operating excursions between extreme positions 180° apart by mechanical or by fluid power means, as shown in the patent to Johnston 2,039,891, May 5, 1936. Fluid, as indicated at 66, is contained in the cylinder 45, the conduit 50, and the cylinder 47. By virtue of the connection between the power-driven means or arm 67 and the piston 46 in the cylinder 45, movement of the arm 67 from the extreme left position of Figure 1 serves to move the piston 46 from the extreme left position of Figure 2. As the piston 46 moves from this position, the fluid 66 is forced from the cylinder 45 through the hose 50 into the cylinder 47, and the piston 48 is moved to the right against the action of the spring 49. Thus, the crank axles 39 and 40 are caused to rotate so that the plow 33 is raised. When the plow is to be lowered, the power-driven arm 67 is moved to the left and the piston 46 to the left. Thus, the piston 48 may also move to the left under the action of the spring 49 and the weight of the plow bottoms 35, and the plow bottoms 35 are permitted to engage the ground again.

The cylinders 45 and 47 with their pistons and rods and the conduit 50 may be considered as a special unit which is disconnectable from the tractor 10 and the plow 33, as shown in Figure 2. All that is required for this disconnection is the disconnection of the cylinder 47 from the point 51 on the plow, the disconnection of the rod 52 from the bell crank 54, the disconnection of the cylinder 45 from the pivot pin at 68 on the crank 69, and the disconnection of the rod 61 from the arm 67. Thus, removal of the unit is possible without a breaking of the fluid line.

With this type of actuating means the crank 67 can be locked or held only in two extreme positions, and thus for an adjustment of the positions between which the plow or other implement connected to the tractor can be shifted, a shifting of the cylinder 45 is required. As seen in Figure 1, the cylinder 45 is connected at 68 to one arm of a bell crank 69 pivoted at 70 on the tractor draw-bar 32—71. The other arm of the bell crank 69 is connected to a nut 72 threaded upon a crank 73 adjustably secured to the drawbar 71 by nuts 74. By means of the crank 73 there may be a lowering or raising of the one arm of the bell crank 69 and a horizontal shifting of the other arm of the bell crank 69 to which the cylinder 45 is attached. Thus, for the two extreme positions of the crank 67 there is adjustment of the extreme positions of the piston 46 within the cylinder 45 and an adjustment of the extreme positions of the piston within the cylinder 47 on the implement.

It will be apparent from the foregoing description that a novel type of means has been devised for the controlling of a tractor-connected implement from the tractor. This means is composed of a special fluid-pressure unit which is readily disconnectable from both tractor and implement without the breaking of a fluid line. The feature of making possible the disconnection of the unit without the breaking of the fluid line is the actuation of the unit by tractor power, if desired, through an external mechanical means. The disconnection of the unit from the force-applying means is effected in or at the external mechanical means, and thus breaking of the fluid line becomes unnecessary. Force is applied to the unit in such a way that the implement adjusted by the unit will be held in any one of a plurality of intermediate positions. Force may be applied in this way because the part of the special unit connected to the tractor is so connected as to be bodily shiftable with respect to the tractor.

Having thus described a single preferred embodiment of the invention with the view of clearly and concisely illustrating the same, I claim:

1. In combination, a tractor including power-driven means selectively controllable for effecting operating excursions between opposite limits of a range of movement, an implement connected to the tractor and including a frame and an implement adjusting part adjustable on said frame, a readily detachable unit for adjusting the implement part by force applied by the tractor, said unit comprising a first device mounted upon the tractor and including a cylinder member and a piston member slidable therein, a second device mounted upon the implement and including a cylinder member and a piston member slidable therein, a flexible conduit connecting the devices, and force-transmitting means confined by said conduit and engaging said piston members, securing means for mounting one member of said second device on the implement frame, means connecting the other member of the second device and the implement part, securing means for mounting one of said members of the first device on the tractor, means connecting the power-driven means with the other member of the first device for shifting the same together with one member of the second device for adjusting the implement part, and manual means for adjusting one of the securing means for bodily adjustment of the one member of one of the associated of said devices to thereby alter the range of movement transmitted to the implement part.

2. In combination, a tractor having a power plant, an adjustable implement connected to the tractor and including a frame and an implement part adjustable on said frame, a readily detachable unit for adjusting the implement by force applied at the tractor, said unit comprising a first device located on the tractor and composed of a cylinder member and a plunger member slidable therein, a second device mounted upon the implement and composed of a second cylinder member and a second plunger member slidable therein, a flexible conduit connecting the devices, and means confined by the conduit for transmitting force from one plunger member to the other plunger member, means connecting the members of the second device respectively with the implement frame and implement part, external power-driven means connected with the plunger member of the first device and operable for shifting the same and therewith the plunger member of the second device for adjusting the implement, power means connecting the external power-driven means and the tractor power plant and being shiftable to a plurality of positions for operating said external power-driven means, and means mounting the cylinder of the first device on the tractor, said mounting means being manipulatable for adjusting the first device cylinder relatively to the tractor and to the plunger therein to effect movement of the plunger in the second device and thereby modify the operating phase of the implement part with respect to that of the external power-driven means pursuant to subsequent operating excursions of said power-driven means.

RUSSEL D. ACTON.

References Cited in the file of this patent

UNITED STATES PATENTS

| Number | Name | Date |
|---|---|---|
| 1,603,668 | Duesenberg | Oct. 19, 1926 |
| 1,931,815 | Conley | Oct. 24, 1933 |
| 2,140,109 | Kellar | Dec. 13, 1938 |
| 2,292,961 | Mott | Aug. 11, 1942 |
| 2,361,326 | Silver | Oct. 24, 1944 |
| 2,369,437 | Court | Feb. 13, 1945 |
| 2,410,918 | Acton | Nov. 12, 1946 |